(12) United States Patent
Loprete

(10) Patent No.: US 7,257,422 B2
(45) Date of Patent: Aug. 14, 2007

(54) PORTABLE RADIOTELEPHONE APPARATUS

(76) Inventor: Joseph A. Loprete, 2821 Spanish River Rd., Boca Raton, FL (US) 33432

( * ) Notice: Subject to any disclaimer, the term of this patent is extended or adjusted under 35 U.S.C. 154(b) by 381 days.

(21) Appl. No.: 09/961,768

(22) Filed: Sep. 24, 2001

(65) Prior Publication Data

US 2003/0060241 A1    Mar. 27, 2003

(51) Int. Cl.
*H04M 1/00* (2006.01)

(52) U.S. Cl. .............. 455/550.1; 455/569.1; 455/90.3; 379/420.04

(58) Field of Classification Search .............. 379/420.01–420.04, 428.01–428.02, 433.01–433.03, 379/433.1; 455/403, 550.1, 569.1–569.2, 455/575.1–575.9, 90.3, 100
See application file for complete search history.

(56) References Cited

U.S. PATENT DOCUMENTS

| | | | |
|---|---|---|---|
| 3,826,879 A * | 7/1974 | Penn et al. ............. | 191/12.4 |
| 5,504,812 A | 4/1996 | Vangarde | |
| 5,528,689 A | 6/1996 | Chan | |
| 5,613,222 A | 3/1997 | Guenther | |
| 5,659,611 A * | 8/1997 | Saksa ............. | 379/433.1 |
| 5,664,012 A * | 9/1997 | Chen ............. | 379/420.04 |
| 5,677,948 A * | 10/1997 | Meister ............. | 379/142.01 |
| 5,796,821 A | 8/1998 | Crouch | |
| 6,078,825 A | 6/2000 | Hahn | |
| 6,082,656 A * | 7/2000 | Thornton ............. | 242/385.4 |
| 6,122,369 A | 9/2000 | Hwang | |
| 6,272,361 B1 * | 8/2001 | Courtis et al. ............. | 455/569.1 |
| 6,631,279 B2 * | 10/2003 | Rivera ............. | 455/575.2 |
| 6,633,770 B1 * | 10/2003 | Gitzinger et al. ............. | 455/575.1 |
| 2001/0005684 A1 * | 6/2001 | Inkinen et al. ............. | 455/556 |
| 2001/0035242 A1 * | 11/2001 | Hughs et al. ............. | 150/154 |
| 2003/0156710 A1 * | 8/2003 | Kear ............. | 379/388.01 |

FOREIGN PATENT DOCUMENTS

| | | | |
|---|---|---|---|
| JP | 11-163780 | * | 6/1999 |
| JP | 11-163991 | * | 6/1999 |
| JP | 2001-168965 | * | 6/2001 |
| WO | WO 9956448 A1 | * | 11/1999 |
| WO | WO 9960764 A1 | * | 11/1999 |

* cited by examiner

*Primary Examiner*—Melur Ramakrishnaiah
(74) *Attorney, Agent, or Firm*—Laurence A. Greenberg; Werner H. Stemer; Ralph E. Locher (57) ABSTRACT

A portable radiotelephone apparatus having a microphone and an earpiece electrically connected individually to respective wires of a two-wire electrical line, and a retraction mechanism with a one-way lock device for the line.

16 Claims, 7 Drawing Sheets

PORTABLE RADIOTELEPHONE APPARATUS

BACKGROUND OF THE INVENTION

1. Field of the Invention

This invention relates to a portable radiotelephone apparatus, particularly a cellular phone, having extensible and retractable electrical wiring for the user's earpiece-speaker and a microphone that can be positioned on the user for hands-free use of the phone.

2. Prior Art

U.S. Pat. No. 6,082,656 to Thornton discloses a cellular phone with an extensible and retractable cord connecting it to a handset which has the usual speaker enabling the user to hear the voice of the person to whom he or she is speaking and a microphone into which the user speaks. A spring-operated cord retraction mechanism located inside the phone housing has a one-way lock enabling the cord to be pulled out and then automatically locking it in its pulled-out position for use of the handset in a phone call. A manually-operated release for the lock device enables the cord retraction mechanism to retract the cord into the phone housing after the user is finished with the phone call.

The following U.S. patents show cellular phone headsets or other unitary devices with a microphone and an earpiece-speaker that communicate with the user's cellular phone in various ways:

Hahn et al U.S. Pat. No. 6,078,825—radio communication;

Vangarde U.S. Pat. No. 5,504,812 and Hwang U.S. Pat. No. 6,122,369—electrical wiring;

Guenther U.S. Pat. No. 5,613,222—either electrical wiring or sound tubing from the microphone to the cell phone, and sound tubing from the phone to the user's earpiece-speaker; and Chan U.S. Pat. No. 5,528,689—sound tubes between the cellular phone and both the microphone and the earpiece-speaker.

SUMMARY OF THE INVENTION

This invention relates to a portable radio telephone apparatus having an extensible and retractable electrical line with a wire to an earpiece containing a speaker and a wire to a small microphone that is physically discrete from the earpiece, the only connection between them being provided by wiring. To initiate or answer a phone call, the user pulls the line away from its housing so that he or she can position the microphone and the earpiece for convenient and effective use. When the user is finished with the call, he or she initiates the automatic retraction of the line into its housing by a spring-operated line retraction mechanism simply by exerting a brief outward pull on the extended line and then releasing it for retraction into the housing to position the earpiece and the microphone next to the housing where they are readily accessible for future use.

One advantage of this invention is to ally the fears of many persons who fear radiation from a cellular phone held next to the head or from a hand set for a cell phone that also is held next to the head. Whether or not such fear is justified, it does inhibit some people from using cell phones and creates anxiety in others who do. With the present invention, the cell phone housing and its conspicuous antenna can be located away from the user's head while the user makes use of the small unobtrusive microphone and the earpiece to carry on a phone conversation. The absence of a handset not only is reassuring to some users, it facilitates hands-free use of the phone for all users, particularly those who use a phone while driving a car or truck.

Further objects and advantages of the invention will be apparent from the following detailed description of three presently preferred embodiments thereof, illustrated in the accompanying drawings.

DETAILED DESCRIPTION OF THE INVENTION

Before explaining the present invention in detail it is to be understood that the invention is not limited in its application to the particular arrangements shown and described herein since the invention is capable of other embodiments. Also, the terminology used herein is for the purpose of description and not of limitation.

Figure 1:
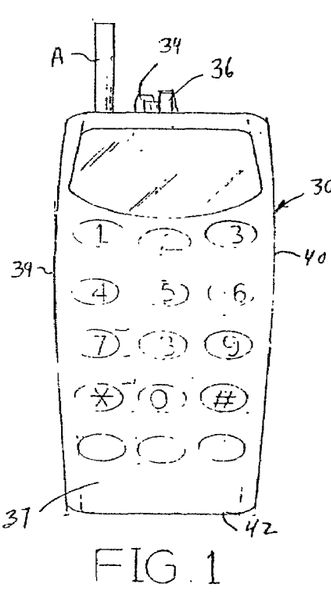
FIG. 1 is a front elevation of a cellular phone of otherwise conventional design that is equipped with a line retraction arrangement in accordance with a first embodiment of the present invention.
Figure 2:
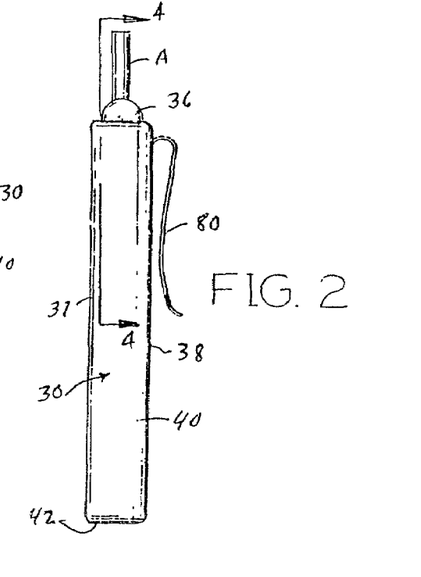
FIG. 2 is an end view of this phone taken from the right in FIG. 1.
Figure 3:
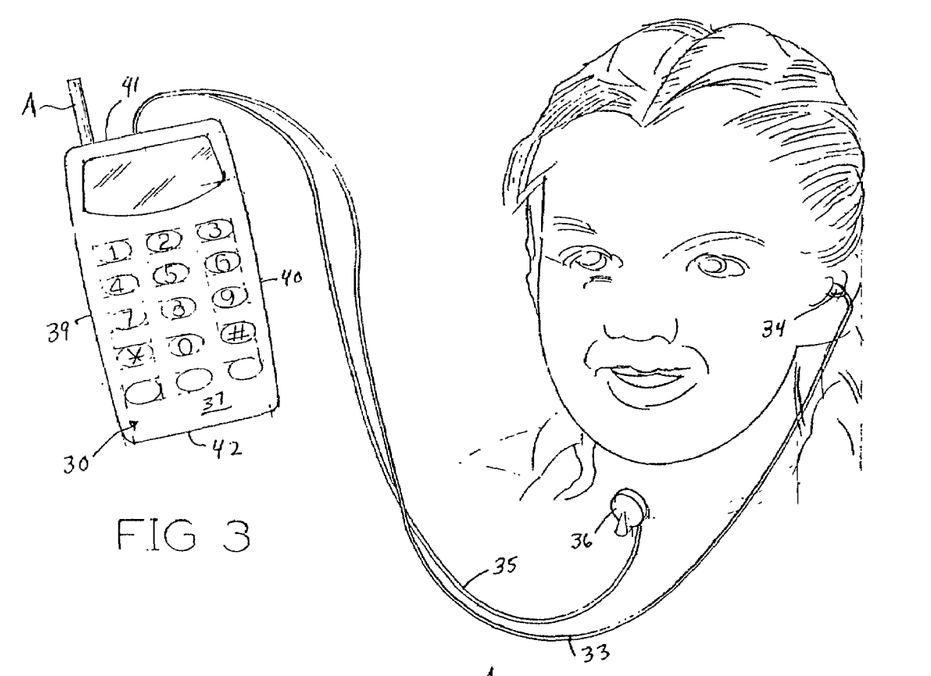
FIG. 3 is a front view of a person using the cellular phone of FIG. 1 with the earpiece and the microphone pulled out from the phone and worn by the user.
Figures 4, 5, 6:
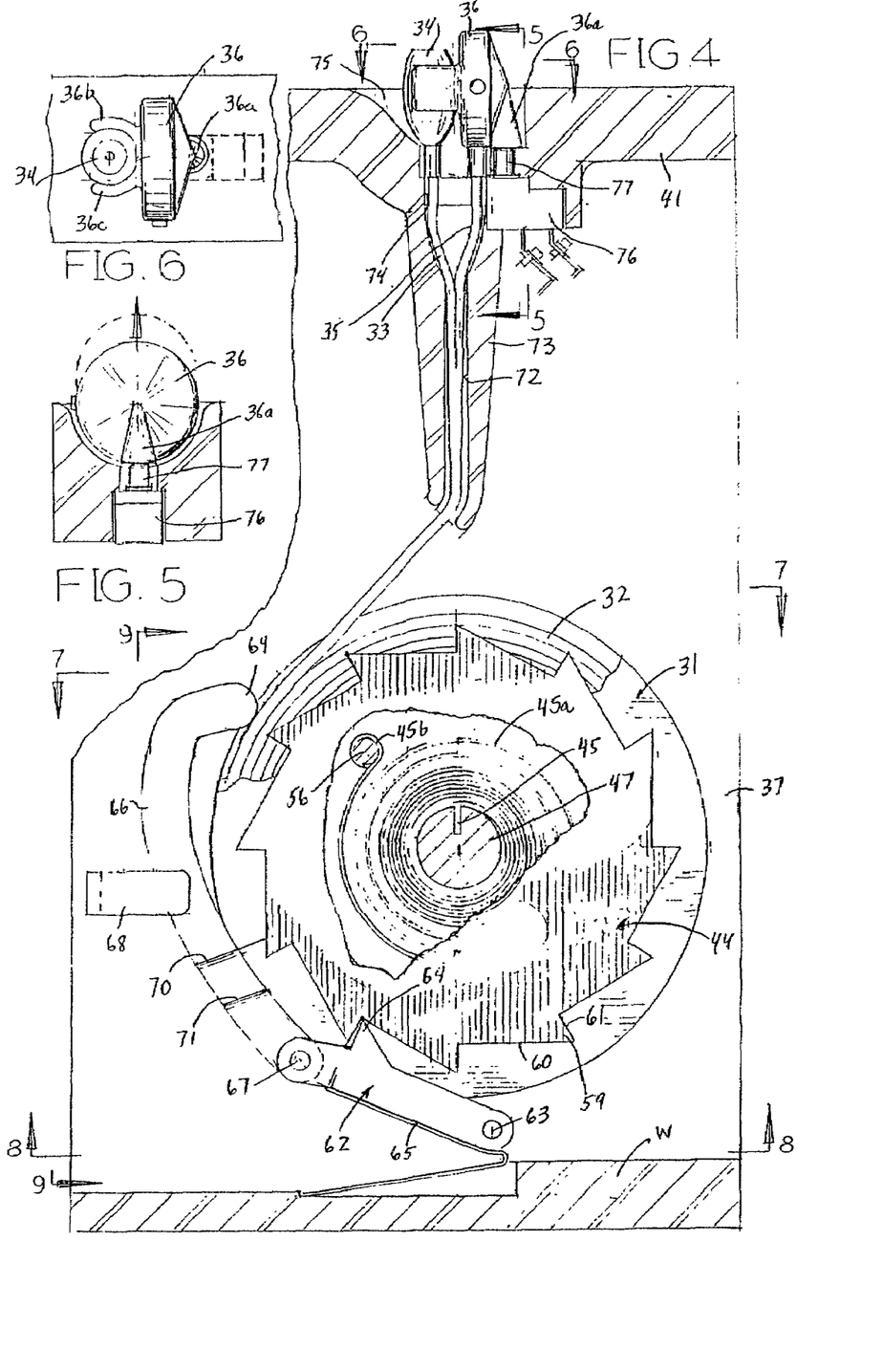
FIG. 4 is a longitudinal vertical section taken along the line 4-4 in FIG. 1 through the upper part of the phone housing, with part of the lock device for the line retraction mechanism broken away to expose other parts, and showing the two-wire electrical line fully retracted.
FIG. 5 is a fragmentary vertical section taken along the line 5-5 in FIG. 4 and showing the microphone and the earpiece seated in the top of the phone housing when the line is fully retracted.
FIG. 6 is a fragmentary top plan view of these parts, taken along the line 6-6 in FIG. 4.
Figure 7:
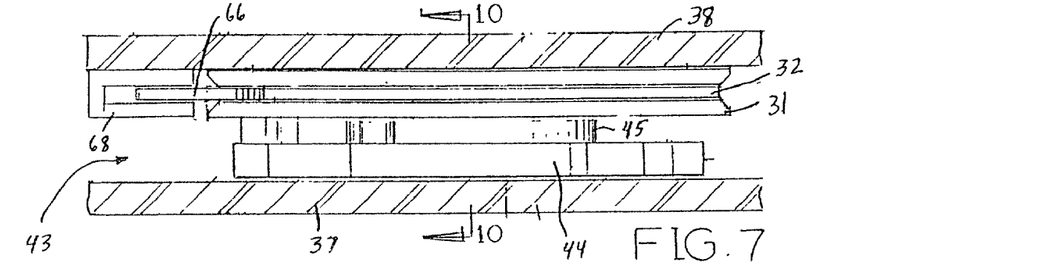
FIG. 7 is a longitudinal horizontal section taken along the line 7-7 in FIG. 4, looking down on the line retraction mechanism and its lock device in this embodiment of the invention.

Referring to FIGS. 1-3, in accordance with a first embodiment of the present invention a cellular phone 30 of conventional design and operating characteristics is provided with a spring-operated wire retraction mechanism having a takeup reel 31 (FIGS. 4, 7, 8, 9 and 10) holding a two-wire electrical line 32 (FIG. 4). Line 32 has a first insulated electrical wire 33 leading to an earpiece 34 containing a conventional speaker and a second electrical wire 35 leading to a conventional microphone 36. As shown in FIG. 3, the earpiece 34 may be inserted in a person's ear so that he or she may hear from the earpiece speaker the voice of the person he or she is conversing with over the cell phone, and the microphone 36 may be removably attached to the user's clothing at the neckline so as to pass to wire 35 the electrical signals representing the words spoken into the microphone by the user.

Figures 8, 9, 10, 11:
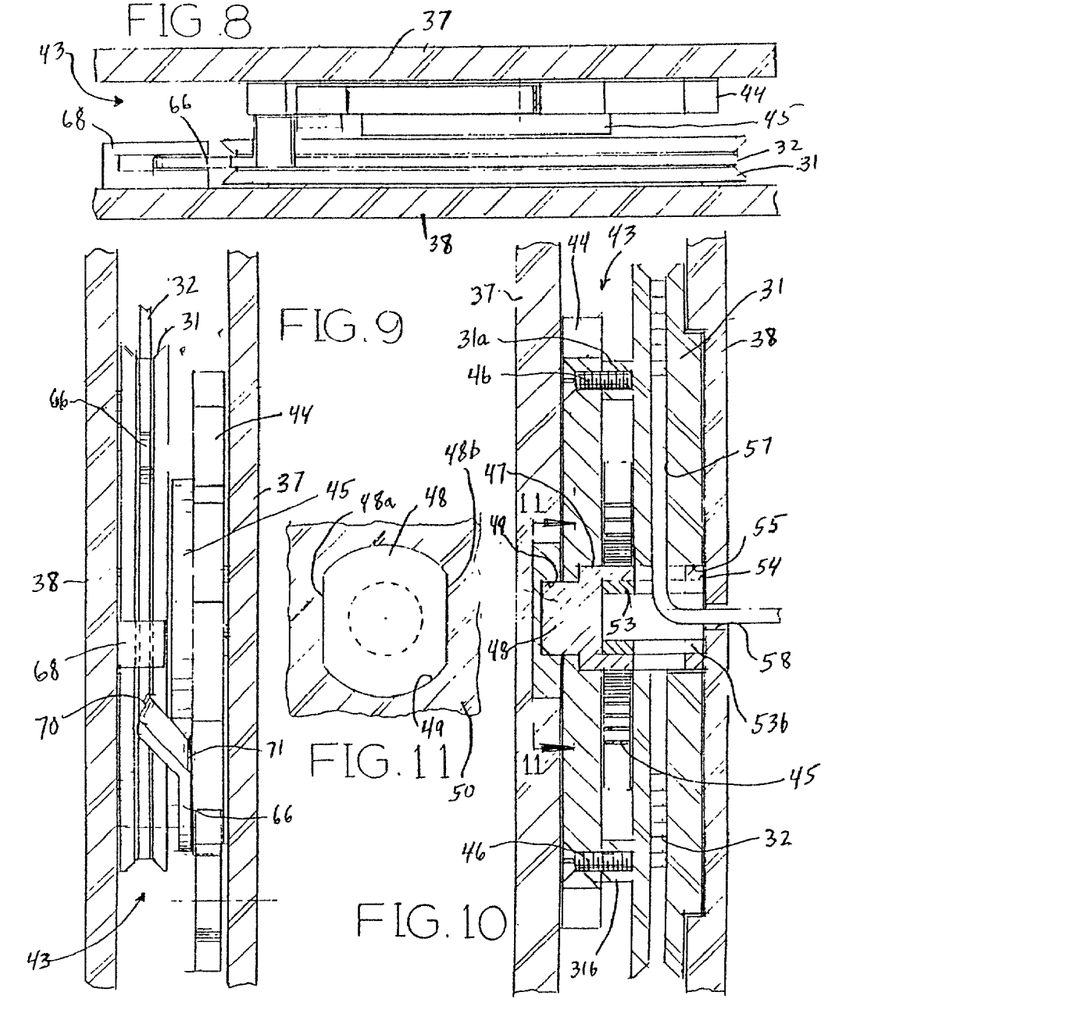
FIG. 8 is a longitudinal horizontal section taken along the line 8-8 in FIG. 4 looking up at the line retraction mechanism and its lock device.
FIG. 9 is a vertical cross-section, with one part broken away, taken along the line 9-9 in FIG. And showing the line retraction mechanism and its lock device in end elevation.
FIG. 10 is a vertical cross-section taken along the line 10-10 in FIG. 7 at the centerline of the takeup reel of the line retraction mechanism.
FIG. 11 is a fragmentary longitudinal vertical section taken along the line 11-11 in FIG. 10.

The cell phone 30 has a housing with a generally flat front wall 37 (FIG. 2), a generally flat back wall 38 extending substantially parallel to the front wall, and opposite side walls 39 and 40 and top and bottom walls 41 and 42 (FIG. 1) connecting the back and front walls. A housing chamber 43 above an internal wall W of the housing (FIG. 4) holds the line retraction mechanism and its lock device. The line retraction mechanism has a takeup reel 31 located closely in front of the housing back wall 38. The lock device has a ratchet wheel 44 rigidly attached to the takeup reel for rotation of the two in unison and is located within the housing closely behind the front wall 37. As shown in FIG. 10, a pair of cylindrical stubs 31a and 31b integral with the inner face of takeup reel 31 engage the inner face of ratchet wheel 44 to space them apart and provide room between them for a spirally wound spring 45 (FIGS. 4 and 10) similar to the mainspring of a mechanical watch or clock. Bolts 46 attach the ratchet wheel to the takeup reel.

Takeup reel 31 and ratchet wheel are both affixed to a fixedly positioned cylindrical hub 47 (FIG. 10) which has a reduced end segment 48 with flat opposite side faces 48a and 48b (FIG. 11) received in a complementary recess 49 formed in a small cylindrical support plate 50 (FIG. 4). Plate 50 is fixedly seated in a complementary recess 51 on the inside of the housing front wall 37. Hub 47 is part of a sub-assembly (FIG. 14) located centrally of the takeup reel and the ratchet wheel. At its inner end the hub 47 presents a cylindrical recess 52 that rotatably receives a short cylindrical shaft 53 having a diametrically opposed pair of longitudinal extensions 53a and 53b that are rotatably received in a cylindrical bushing 54 which, as shown in FIG. 10, is fixedly seated in a complementary recess 55 formed in the outer face of takeup reel 31.

As shown in FIG. 4, the spiral spring 45 (which is part of the line retraction mechanism) has a transverse inner end segment 45a secured to the fixedly positioned hub 47 and an outer end loop 45b attached to the rotatable takeup reel 31 and ratchet wheel 44 by a cross pin 56. Spring 45 urges the takeup reel and the ratchet wheel counterclockwise in FIG. 4, thereby acting to wind up the two-wire phone line 32 on the takeup reel and retract the line into the cell phone housing.

Figures 13, 14, 15:
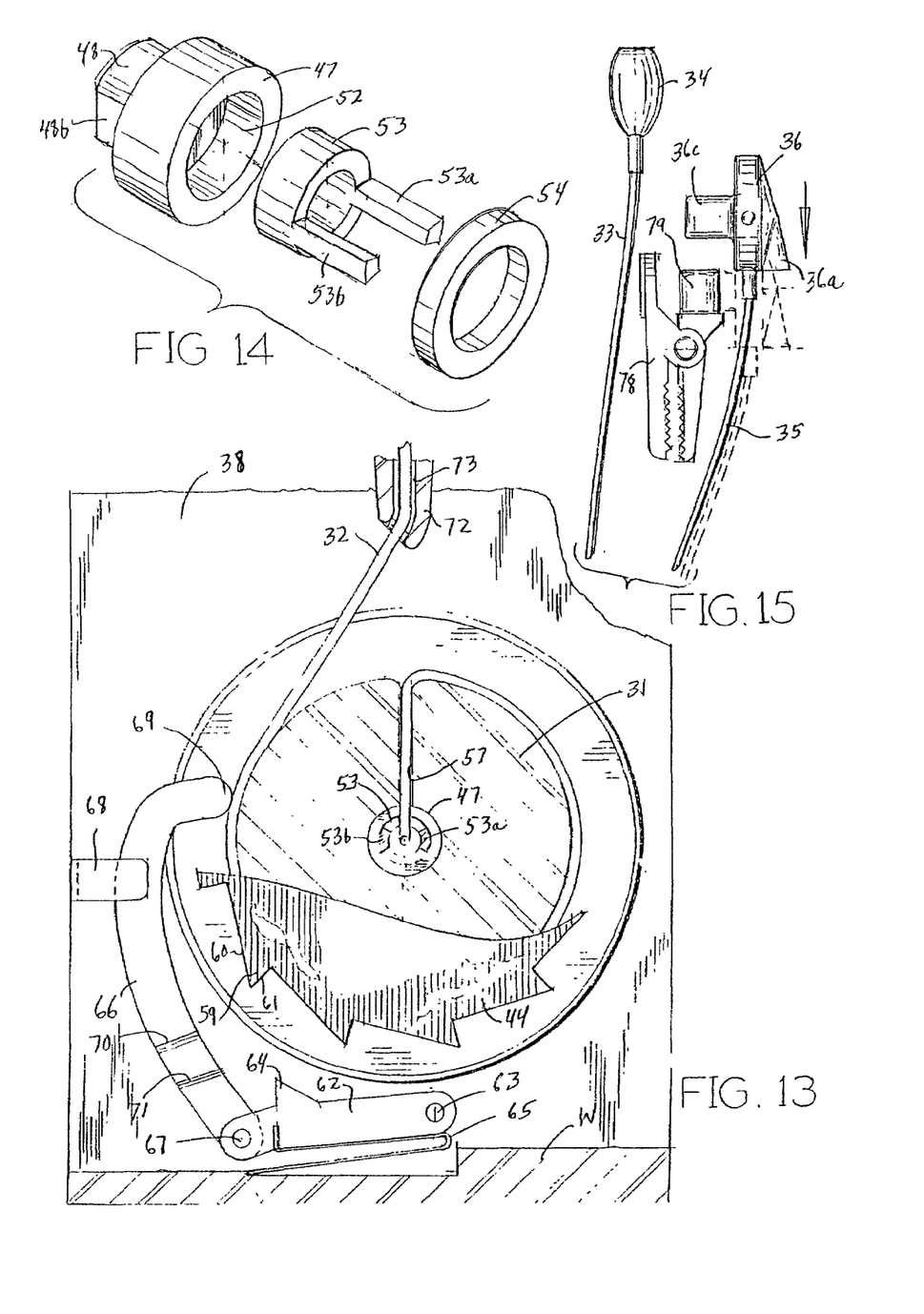
FIG. 13 is a view similar to FIG. 12 and showing the position of these parts when the lock device is released to permit the line retraction mechanism to retract the extended line.
FIG. 14 is an exploded perspective view of the hub sub-assembly for rotatably supporting the takeup reel of the line retraction mechanism and the ratchet wheel of the lock device in this embodiment of the invention.
FIG. 15 is a fragmentary elevation of the earpiece, the microphone and an attachment clip for the microphone in this embodiment of the invention.

As shown in FIGS. 10 and 13, line 32 passes through a small radial passage 57 in the takeup reel and through the space between the extensions 53a and 53b of the rotatable shaft 53 and out through the support ring 54 and a central opening 58 (FIG. 10) in the housing back wall 38 to the circuitry (not shown) in the lower part of the cell phone below chamber 43 so that outgoing voice messages from the user's microphone 36 are conducted to the cell phone circuitry and incoming voice messages are conducted from the cell phone circuitry to the user's earpiece 34.

If desired, the cell phone circuitry may be in a different housing from the one that holds takeup reel 31 and ratchet wheel 44. In that case, the battery pack for the cell phone may be in either the housing for the takeup reel and ratchet wheel or the housing for the cell phone circuitry.

As shown in FIG. 4, ratchet wheel 44 is formed with a plurality of teeth 59 in succession along its periphery, each having a relatively long, flat, slanted face 60 and a short, flat, radial face 61 extending between the outer end of the slanted face 60 of one tooth and the inner end of the slanted face 60 of the next tooth. The lock device also includes a pawl 62 pivotally mounted at 63 and presenting an upwardly projecting tooth 64 for engaging the toothed periphery of ratchet wheel 44. A reversely bent spring 65 biases the pawl against the ratchet wheel to normally position the pawl tooth 64 in locking engagement with the radial face 61 of the adjacent tooth 59 on the ratchet wheel, thereby locking the ratchet wheel against counterclockwise rotation in FIG. 4 under the urging of spring 45, which is the direction for winding up the two-wire line 32 on the takeup reel.

The lock device also includes a line hold-down finger 66 pivoted at 67 to the free end of pawl 62 (i.e., the end away from the latter's pivot 63). Finger 66 passes snugly but freely between the opposite sides of a bifurcated guide 68 (FIGS. 7 and 8) fixedly mounted on the inside of the cell phone housing and it presents an inwardly projecting tip segment 69 with a rounded surface that engages the line 32 to hold it snugly in place on takeup reel 31. As shown in FIG. 9, finger 66 is formed with a bend at 70 a short distance below the guide 68, and it projects down from this bend at an angle away from the takeup reel 31 and toward the ratchet wheel 44 to another bend at 71, and then downward parallel to the takeup reel to its pivotal connection at 67 to the pawl 62.

As shown in FIG. 4, the two-wire line 32 passes slidably up through a vertically elongated, tapered opening 72 in a line guide segment 73 of the cell phone housing that is molded integral with the housing top wall 41. When the line is fully retracted, the outer ends of its two wires 33 and 35 are received in a recess 74 formed in the housing just above the upper end of the opening 72 in its line guide segment 73, and the earpiece 34 and the microphone 36 are seated in an open-topped enlargement 75 of recess 74 at the latter's upper end.

An on/off switch 76 for the cell phone is mounted just below recess 75 and presents an upwardly-projecting, spring-biased plunger 77 that turns this switch on and off, the switch contacts being open when the plunger is depressed and closed when the plunger is in its uppermost position (to which it is spring-biased). The casing of microphone 36 presents a projection 36a on one side that engages the top of the switch plunger 77 and holds it down (against the upward force of its bias spring) in the switch-off position when the microphone is seated in the housing recess 75. As shown in FIG. 6, on the opposite side from its switch-operating projection 36a the microphone casing presents a pair of oppositely curved, flexible and resilient fingers 36b and 36c that grip the earpiece 35 between them in a manually separable manner.

Figures 12, 16, 17:
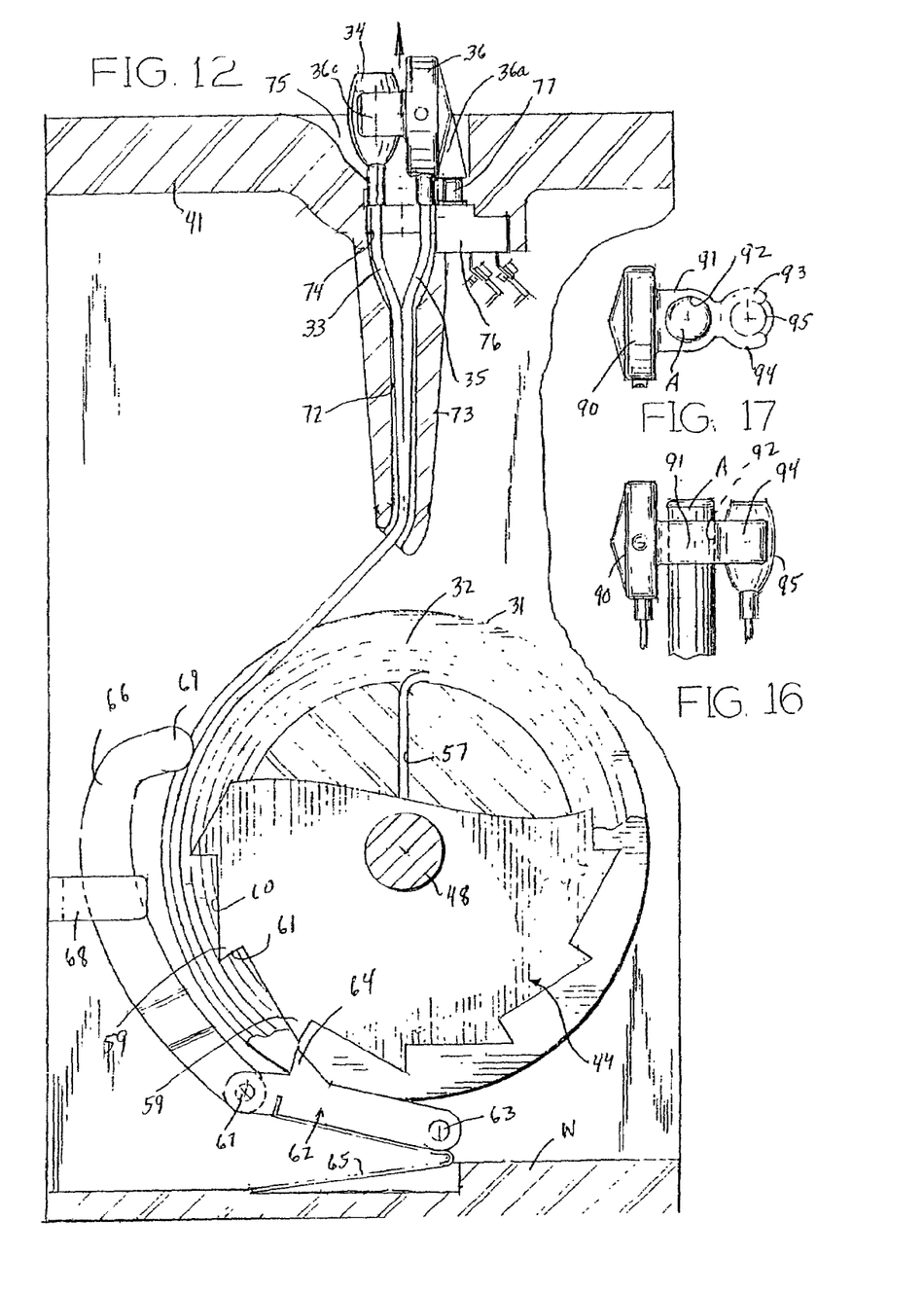
FIG. 12 is a view similar to FIG. 4 and showing the line retraction mechanism and its lock device when the two-wire line is being pulled out of the cell phone housing.
FIG. 16 is a fragmentary elevation showing a second arrangement for positioning the microphone and the earpiece next to the phone when the line is retracted by a mechanism as shown in the first embodiment of this invention.
FIG. 17 is a top plan view of the FIG. 16 sub-assembly.

Referring to FIG. 12, when the user wants to use the cell phone he or she pulls the earpiece 34 and the microphone 36 together up from recess 75 in the housing top wall. This begins to unwind the line 32 from the takeup reel 31, causing the ratchet wheel 44 to turn clockwise in this Figure of the drawing, riding easily over the pawl 62 because of the inclination of the slanted faces 60 of its successive teeth. As soon as the user relaxes the outward pull on line 32, the pawl 62 returns to the position shown in FIG. 4, locking the ratchet wheel 44 and the takeup reel 31 against turning in the line-retracting direction in which spring 45 urges them. The user separates the microphone 36 from the earpiece 34 and attaches the microphone to an alligator clip 78 (FIG. 15) that has a cylindrical post 79 on top for gripping engagement by the curved fingers 36b and 36c on the microphone casing. The microphone can then be clipped to the user's shirt or other wearing apparel at the neckline, as shown in FIG. 3, and the earpiece 34 inserted in one ear of the user. The cell phone casing has a spring clip 80 on the back (FIG. 2) enabling it to be attached to the user's belt or some other convenient location on the user's apparel. As soon as the projection 36a on the microphone disengages from the switch plunger 77, the switch 76 automatically turns the cell phone on so that it is ready for use as soon as the user has the earpiece 34 and the microphone 36 in place as shown in FIG. 3.

After the user has finished using the phone the two-wire line 32 can be retracted into the phone housing by the takeup reel 31 by first exerting a brief outward pull or tug on the line to fully extend it and cause ratchet wheel 44 to push pawl 62 out of engagement with its toothed periphery (FIG. 13). When the user now releases the outward pull on the line, the coil spring 45 turns the takeup reel 31 and the ratchet wheel 44 counterclockwise in this Figure of the drawings, retracting the line into the phone housing and winding it on the takeup reel.

FIGS. 16 and 17 show a second embodiment of the invention in which the top recess 75 in the cell phone housing and the on/off switch 76 operated by the microphone casing are omitted. In other respects the cell phone, the line retraction mechanism and its lock device are the same as in the just-described first embodiment of the invention. In this second embodiment of the invention the microphone and the earpiece are mounted on the usual antenna structure A projecting up from the cell phone housing. The microphone casing 90 has an apertured projection 91 on the back that is formed with an opening 92 for snugly but slidably receiving the upwardly projecting antenna structure A to mount the microphone on it. Behind the projection 91 the microphone casing presents a pair of oppositely curved, flexible and resilient fingers 93 and 94 that grasp the earpiece 95 between them in the same manner as in the first embodiment of the invention, thereby attaching the earpiece to the microphone so that both are positioned on the antenna structure A when the cell phone is not in use. The earpiece can be manually separated from the microphone after they are detached from the antenna structure A when the phone is to be used.

In the third embodiment of the invention (FIGS. 18-25) the cell phone 130 may be substantially identical to the one in the first embodiment, with the same kind of line retraction mechanism and a lock device for it. The two-wire electrical line 132 (FIG. 25) extends from the phone to the casing of a microphone 136 which contains a retraction mechanism and its lock device for an insulated wire 133 that goes from the microphone to the earpiece 134. That is, the line from the cell phone 130 to the microphone casing contains two insulated electrical wires, one for the microphone and another for the earpiece.

Inside the microphone casing is a line retraction mechanism and its lock device for retracting the wire 133 that goes from the microphone casing to the earpiece 134. This retraction mechanism and the lock device associated with it are functionally but not structurally identical to those in the cell phone casing of FIGS. 1-15. Elements of the line retraction mechanism and its lock device in microphone casing are given the same reference numerals plus 100 as the corresponding functional elements of the embodiment of FIGS. 1-15, so the detailed description of these corresponding elements need not be repeated.

The microphone casing has a convex front piece 101 (FIG. 20) formed with a plurality of openings 102 for passing sound from the user's voice to the usual electroacoustic transducer inside. The microphone casing also has a back piece 103 with an annular peripheral flange 104 threadedly attached to a mating part of front piece 101.

Figures 18, 19, 20, 21:
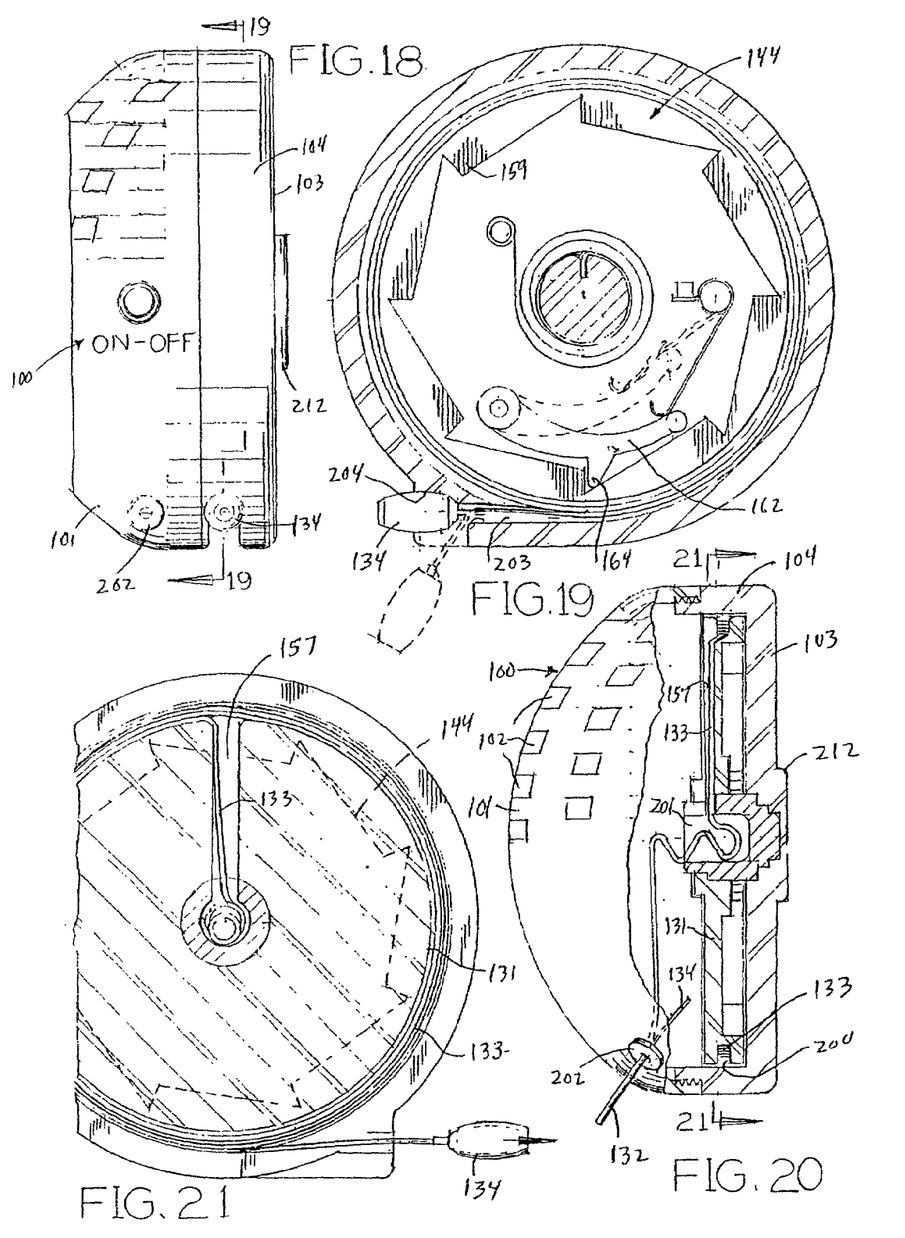
FIG. 18 is a side elevation of the microphone in a third embodiment of this invention, with the microphone casing broken away at one end.
FIG. 19 is a longitudinal vertical section taken along the line 19-19 in FIG. 18, showing the lock device for the earpiece wire retraction mechanism inside the microphone casing.
FIG. 20 is a view of the FIG. 18 device, partly in vertical cross-section and partly in side elevation.
FIG. 21 is a longitudinal vertical section taken along the line 21-21 in FIG. 20, showing in cross-section the takeup reel of the wire retraction mechanism inside the microphone casing.

As shown in FIG. 19, the ratchet wheel 144 of the lock device for the line retraction mechanism inside the microphone casing is ring-shaped and presents ratchet teeth 159 in succession along its inside circumference. The pawl 162 of this lock device is positioned inside the ring formed by the ratchet wheel and it presents an outwardly projecting locking tooth 164 for engagement with the toothed inside periphery of the ratchet wheel.

As shown in FIG. 20, the takeup reel 131 of the line retraction mechanism inside the microphone casing has a peripheral groove 200 for holding successive turns of the insulated wire 133 leading from the microphone casing to the earpiece 134. Reel 131 has a radial passage 157 (FIG. 21) leading from its peripheral groove 200 to a central recess 201 that is open at the inside of the microphone casing to pass this wire to an opening provided with an annular fitting 202 in the front piece 201 of this casing. As shown in FIG. 20, the microphone wire 135 of the two-wire line also comes into the microphone casing through fitting 202. Outside the microphone casing, the two insulated wires 133 and 135 are joined physically together to form the single two-wire line 132 for ease of handling.

From the peripheral groove 200 in the takeup reel 131 the earpiece wire 133 passes through a tapered opening 203 (FIG. 19) in the back piece 103 of the microphone casing. When the earpiece wire is fully retracted, as shown in FIG. 19, the earpiece 134 seats in a partly complementary recess 204 formed in the outside of back piece 103 at the outer end of its opening 203.

Figure 22:
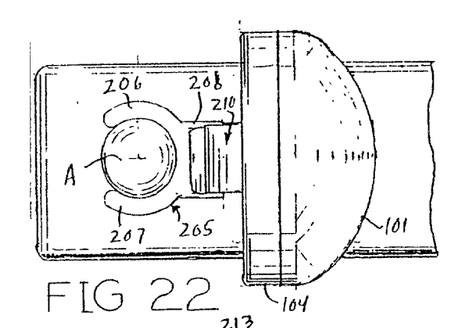
FIG. 22 is a top plan view showing the microphone of FIGS. 18-21 mounted on top of the housing of a cellular phone.
Figure 23:
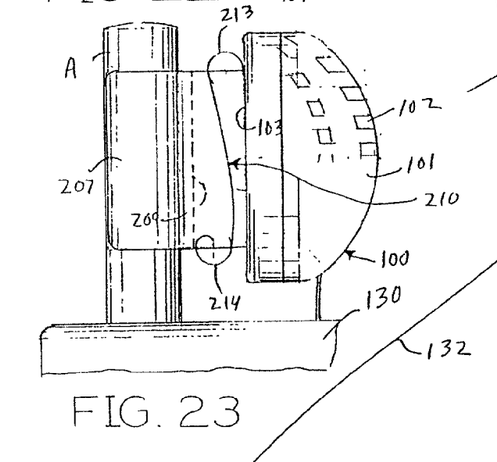
FIG. 23 is a side elevation showing the manner in which the microphone and the earpiece of this embodiment of the invention are supported on the antenna of the cell phone.

The antenna A on the top of the cell phone 130 carries a bifurcated fitting 205 (FIGS. 22, 23 and 25) that presents resilient, oppositely curved, arcuate fingers 206 and 207 that grip the antenna between them and a segment 208 (FIG. 22) that projects behind these fingers and presents an opening 209 from top to bottom in FIG. 23.

Figure 24:
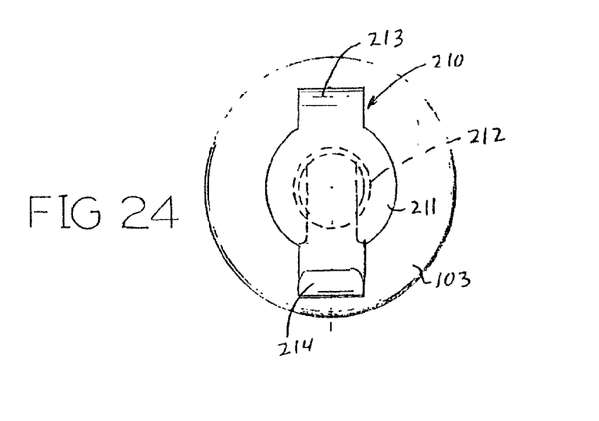
FIG. 24 is a rear elevation of the microphone casing provided with a spring clip for mounting purposes.

A spring clip 210 is rigidly attached in cantilever fashion to the back 103 of the microphone casing for snug reception in the opening 209 in the antenna fitting to mount the microphone on the antenna when the phone is not in use. As shown in FIG. 24, spring clip 210 presents a flat attachment segment 211 formed with a circular opening for snugly receiving a circular boss 212 (FIGS. 18 and 20) on the back of the microphone casing so that this attachment segment of the spring clip fits flat against the back wall 103 of the microphone casing. From this attachment segment the clip extends up across the back of the microphone casing to a curved top segment 213 (FIG. 23) and then down through the opening 209 in the antenna fitting 205 to an oppositely curved free end segment 214 at the bottom.

Figure 25:
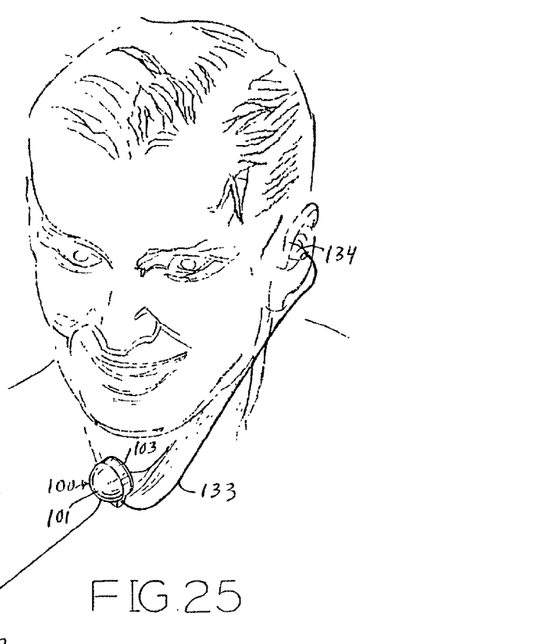
FIG. 25 is a front view of a person using the cellular phone with the microphone of FIGS. 18-24 pulled out from the phone and worn by the user and the earpiece pulled away from the microphone and worn by the user.

When the cell phone is not in use, the spring clip 210 mounts the microphone 100 and the retracted earpiece 134 on the cell phone antenna A as shown in FIGS. 22 and 23. When the cell phone is to be used, the spring clip 210 on the microphone is removed from the antenna fitting 205, and it may be attached to the user's clothing at the neckline (FIG. 25).

From the foregoing detailed description taken in conjunction with the accompanying drawings, it will be apparent that each of the disclosed embodiments of this invention provides for the effective positioning of the microphone and the earpiece on the cell phone when the phone is not in use, and for the convenient positioning of the microphone and the earpiece on the user in a manner to allay any fear the user may have about radiation from the cell phone when it is in use.

I claim:

1. A portable radiotelephone apparatus comprising:
   a portable housing;
   a line retraction mechanism in said housing;
   a two-wire electrical line operatively coupled to said line retraction mechanism inside said housing and presenting respective outer ends of said two wires outside said housing, said line being extensible from said housing;
   an earpiece shaped and dimensioned to be retained hands-free in a user's ear and containing a speaker on the outer end of one wire of said line, said one wire of said line providing a direct connection of said earpiece to said line retraction mechanism and being obstruction-free between said retraction mechanism and said earpiece to enable the positioning of said earpiece in immediate proximity to said housing when said line is retracted into said housing;
   a small microphone on the outer end of the other wire of said line, said other wire of said line providing a direct connection of said microphone to said line retraction mechanism and being obstruction-free between said retraction mechanism and said microphone to enable the positioning of said microphone in immediate proximity to said housing when said line is retracted into said housing, and said microphone being physically disconnected from said earpiece except by said line when the line is extended from said housing;
   and attachment means coupled rigidly to said microphone for physically attaching the microphone to the user's clothing so that the position of the microphone is determined by the position of said attachment means independent of the position of said earpiece;
   said line when extended from said housing enabling the positioning of said microphone by said attachment means on the user's clothing to receive the user's voice during use of the radiotelephone and the separate positioning of said earpiece hands-free in the user's ear;
   and said retraction mechanism being selectively operable to retract said line into said housing and position said earpiece and said microphone in immediate proximity to said housing when the radiotelephone is not in use.

2. An apparatus according to claim 1 and further comprising; a one-way lock device for said line retraction mechanism operable automatically to lock said retraction mechanism against retracting said line from the position to which it has been extended, said lock device being operable in response to a pull on the extended line to unlock said retraction mechanism for automatic retraction of the line into said housing.

3. An apparatus according to claim 2 wherein:
   said line retraction mechanism comprises a rotatable takeup reel on which said line is wound, and spring means biasing said takeup reel in the rotational direction to retract the line;
   and said lock device comprises a ratchet wheel coupled to said takeup reel to rotate in unison therewith, a pawl, a pawl spring biasing said pawl against said ratchet wheel to normally prevent rotation of the ratchet wheel and takeup reel in said one directions and means positioning said pawl to disengage from the ratchet wheel and permit rotation of the ratchet wheel and the takeup reel in said one direction in response to an outward pull on the line.

4. An apparatus according to claim 3, wherein said housing has a top opening therein which passes said line and an open-topped recess around said opening for seating said microphone and said earpiece when said line is fully retracted.

5. An apparatus according to claim 3 and further comprising:
   an antenna projecting up from said housing;
   and means for releasably attaching said microphone and said earpiece together on said antenna when said line is fully retracted.

6. An apparatus according to claim 2 wherein said housing has a top opening therein which passes said lime and an open-topped recess around said opening for seating said microphone and said earpiece when said line is fully retracted.

7. An apparatus according to claim 2 and further comprising:
   an antenna projecting up from said housing;
   and means for releasably attaching said microphone and said earpiece together on said antenna when said line is fully retracted.

8. An apparatus according to claim 1 wherein:
said line retraction mechanism comprises a rotatable takeup reel on which said line is wound, and spring means biasing said takeup reel in the rotational direction to retract the line;
and said lock device comprises a ratchet wheel coupled to said takeup reel to rotate in unison therewith, a pawl, a pawl spring biasing said pawl against said ratchet wheel to normally prevent rotation of the ratchet wheel and take up reel in said one direction, and means positioning said pawl to disengage from the ratchet wheel and permit rotation of the ratchet wheel and the takeup reel in said one direction in response to an outward pull on the line.

9. A portable radiotelephone apparatus comprising:
a housing having an opening formed therein;
a line retraction mechanism disposed in said housing;
an electrical line having one end operatively coupled to said line retraction mechanism and an opposite end extensible outside said housing from said line retraction mechanism through said opening, and said electrical line having two wires;
an earpiece containing a speaker connected at said opposite end by one of said two wires;
a microphone connected at said opposite end by the other of said two wires;
a recess formed in said housing at said opening, said recess configured for retaining said microphone and said earpiece therein in a retracted state of said electrical line.

10. The portable radiotelephone apparatus according to claim 9, further comprising:
an electrical switch for turning the apparatus on, said switch being disposed at said recess, said switch having a plunger projecting into said recess for switching said switch, one of said microphone and said earpiece being configured for engaging said plunger in said retracted state of said electrical line.

11. The portable radiotelephone apparatus according to claim 9, wherein said electrical line has a point thereon spaced from said opposite end at which the two wires can diverge from one another, said point being disposed in said housing in said retracted state of said electrical line.

12. The portable radiotelephone apparatus according to claim 9, wherein said microphone has a clip for attaching said earpiece thereto.

13. The portable radiotelephone apparatus according to claim 9, wherein said earpiece has a clip for attaching said microphone thereto.

14. A portable radiotelephone apparatus comprising:
a housing having an opening formed therein;
an antenna disposed externally on said housing;
a line retraction mechanism disposed in said housing;
an electrical line having one end operatively coupled to said line retraction mechanism and an opposite end extensible outside said housing from said line retraction mechanism through said opening, and said electrical line having two wires;
an earpiece containing a speaker connected at said opposite end by one of said two wires;
a microphone connected at said opposite end by the other of said two wires;
a clip connecting said earpiece and said microphone to said antenna, said clip configured to release said microphone and said earpiece for allowing said electrical line to be extended away from said housing.

15. The portable radiotelephone apparatus according to claim 14, wherein said electrical line has a point thereon spaced from said opposite end at which the two wires can diverge from one another.

16. The portable radiotelephone apparatus according to claim 15, wherein said point is disposed in said housing in said retracted state of said electrical line.

* * * * *